2,719,899

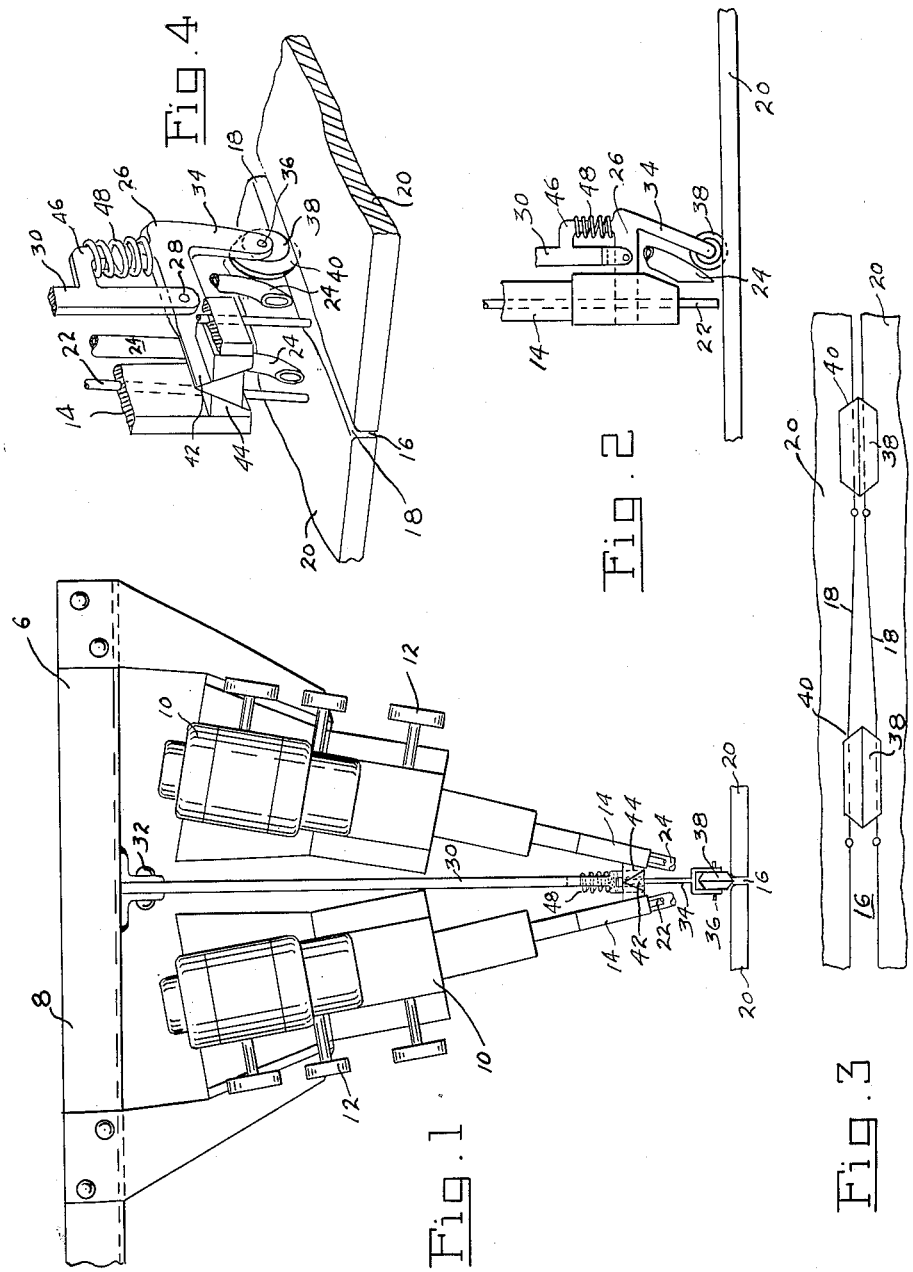

Patented Oct. 4, 1955

2,719,899

AUTOMATIC DUAL ELECTRODE CONTROL FOR ARC-WELDING MACHINES

Harry F. Schwarting, Webster Groves, Mo., assignor to American Car and Foundry Company, New York, N. Y., a corporation of New Jersey Application March 9, 1953, Serial No. 341,097

8 Claims. (Cl. 219—8)

This invention relates generally to electric welding apparatus and particularly to means for controlling the spacing between the dual electrodes of an automatic arc-welding machine in accordance with variations in the width of the gap between irregular adjacent edges of structural members to be seam-welded together.

Due to irregularities in the edges of standard structural shapes and particularly large-sized channels, I-beams, etc., such as are used in the fabrication of railway car center sills and the like, the width of the gap between the adjacent edges along which the seam is to be welded is likely to vary greatly. In order to produce a satisfactory weld, the weld metal should be evenly deposited and fused in the gap, but heretofore no automatic mechanical device has been developed to successfully accomplish this. It is conventional to manually seam-weld such structures, but this obviously is a relatively slow and expensive operation. If the rough edges of the metal shapes were machined or finished smoothly to close tolerances, this problem of automatic seam-welding of large shapes would be eliminated. However, it is obvious that this would also involve an expensive process adding materially to the cost of production.

It is an object of the present invention to provide automatic means for producing a satisfactory seam weld between adjacent irregular edges, particularly of large-sized structural shapes.

Another object of the invention is to provide means for automatically adjusting the spacing between dual electrodes of an automatic arc-welding machine in accordance with variations in the width of the gap between adjacent irregular edges of the members to be seam-welded.

Still another object of the invention is the provision of mechanism as above described in which wedge-treaded roller means is engageable in the gap and movable during the welding operation in response to variations in the width of the gap to correspondingly vary the distance between the dual electrodes.

These and other objects of the invention will be apparent to those skilled in the art from a study of the following description taken with the accompanying drawings, in which:

Fig. 1 is an end elevational view of an automatic arc-welding machine showing the device of the present invention installed therein;

Fig. 2 is a fragmentary view of the welding machine showing the device in side elevation;

Fig. 3 is a diagrammatical plan view of the gap between the adjacent irregular edges of the members to be seam-welded, showing variations in the width thereof and two positions of the roller of the device relative thereto, and Fig. 4 is a fragmentary perspective view of the welding machine embodying the present device in position to seam-weld the adjacent edges of two structural members.

Referring now more in detail to the drawings, the present device is embodied in an automatic arc-welding machine generally indicated at 6 having a frame 8 carrying a pair of welding heads 10. The welding heads are adjustably mounted and their movements to and from various positions controlled by any suitable type of conventional adjusting means such as shown at 12. The arc-welding machine may be of standard automatic type and, therefore, only those parts thereof deemed necessary to an understanding of the invention are shown. The machine is equipped with a pair of spaced-apart spring or resilient metal electrode guiding members 14 adapted to be positioned upon proper adjustment of the welding heads cross-wise above the gap 16 between the adjacent irregular edges 18 of two members or structural shapes 20 to be seam-welded together. Electrode or welding wire (wire electrodes) 22 is unwound from conventional apparatus (not shown) and passed through holes or appropriately shaped channels in the guiding members for feeding of metal to be deposited and fused in the gap to form the seam weld. The machine is also equipped with the customary flux feeding conduits 24, only fragmentarily shown in the drawings.

The device of the present invention comprises an arm 26 pivotally carried at 28 at a point forwardly of the electrode guiding members 14 on the end of a depending support member 30 secured by rivets 32 or otherwise suitably fixed to the frame 8 of the machine. The arm 26 is formed at one end with a downwardly depending portion 34 which carries at its end on a pivot pin 36 a roller 38. The roller 38 is provided with a wedge-shaped tread 40 adapted to ride in the gap 16 during the welding operation in engagement with the adjacent irregular edges 18 of the members 20. The opposite end of the arm 26 extends between the electrode guiding members 14 and is formed with upwardly converging wedge faces 42. The lower inside surface of the electrode guiding members 14 are provided with complementary downwardly diverging wedge faces 44 in cooperative engagement with the wedge faces 42 on the end of arm 26. A bracket 46 extends from the lower portion of the support member 30 to provide the mounting for a spiral compression spring 48 seated between the bracket 46 and arm 26 which acts to constantly urge the wedge-treaded roller 38 down into engagement with the adjacent edges 18 forming the gap 16.

It will be seen from the above description that an efficient and simple device has been provided for automatically varying the distance between the electrode guiding members in accordance with variations in the width of the gap along which the members are to be seam-welded. The wedge-treaded roller 38 rides in the gap 16 in advance of the electrodes 22 during the welding operation and is free to move up and down in response to variations in the width of the gap due to irregularities in the adjacent edges of the members. The roller will ride lower in the gap as it widens due to the engagement of the wedge-shaped tread 40 with the adjacent irregular edges 18 and for the same reason will ride higher in the gap as it narrows. This obviously causes rotational movement of the arm 26 about the pivot 28 which in turn slides the wedge faces 42 on the arm relative to the complementary wedge faces 44 on the electrode guiding members 14. Therefore, as the roller 38 rides lower in the gap in response to increase in the width thereof, the distance between the electrode guiding members 14 will be correspondingly increased due to upward movement of the wedge 42 relative to the wedges 44. When the roller 38 again encounters a narrowing portion of the gap, it will ride higher therein and the wedge 42 will therefore move downwardly with respect to the wedges 44, permitting the resilient spring metal electrode guiding members 14 to return to a position of less distance from each other to the extent as controlled by interengagement of the complementary wedge faces.

The electrode guiding members 14 have been described in the present instance as made of resilient or spring metal; however, it will be understood that these guiding members may be of rigid metal pivotally or otherwise mounted with spring or similar resilient means used to constantly urge them towards each other to assume normal position. Also, the device is shown as provided with a compression spring 48, which possibly may be eliminated since the combined weight of arm 26, 34 and roller 38 could be sufficient to retain the latter engaged in the gap against the relatively small frictional resistance of the sliding wedges in spreading the resilient electrode guiding members.

The invention may thus be modified in these as in other various respects as will occur to those skilled in the art and the exclusive use of all modifications that come within the scope of the appended claims is contemplated.

What is claimed is:

1. In a welding machine, a pair of spaced-apart resilient electrode guiding members adapted to be positioned cross-wise above the gap between the adjacent edges of two metallic members to be seam-welded together, and means engageable with the edges of said metallic members and shiftable during the welding operation in response to variations in the width of said gap due to irregularities of the edges of said metallic members, said shiftable means being operatively connected with and acting to increase the distance between said electrode guiding members in accordance with increase in the width of said gap.

2. In a welding machine, a pair of spaced-apart resilient electrode guiding members adapted to be positioned across and above the gap between the adjacent edges of two metallic members to be seam-welded together, and pivotally mounted means including a wedge-shaped member extending into said gap engageable with the edges of said metallic members and being vertically reciprocable during the welding operation in response to variations in the width of said gap due to irregularities of the edges of said metallic members, said pivotally mounted means being operatively connected with and acting to increase the distance between said electrode guiding members in accordance with increase in the width of said gap.

3. In a welding machine, a pair of spaced-apart resilient electrode guiding members adapted to be positioned across and above the gap between the adjacent edges of two metallic members to be seam-welded together, an arm pivotally mounted on said machine, a roller on one end of said arm having a wedge-shaped tread riding in said gap in advance of said electrode guiding members, said roller being engageable with the edges of said metallic members and vertically movable during the welding operation in response to variations in the width of said gap due to irregularities of the edges of said metallic members, and means on the other end of said arm extending between and operatively connected with said electrode guiding members whereby to increase the distance therebetween in accordance with increase in the width of said gap.

4. In a welding machine having a pair of spaced-apart spring metal electrode guiding members adapted to be positioned cross-wise above the gap between the adjacent edges of two metallic members to be seam-welded together, an arm pivotally mounted intermediate its ends on said machine, a roller on one end of said arm having a wedge-shaped tread adapted to ride in said gap in advance of said electrode guiding members, said roller tread being engageable with said adjacent edges of the metallic members and free to ride up and down in said gap during the welding operation in response to variations in the width thereof due to irregularities of said edges of the metallic members, and interengaged cooperable means on the other end of said arm and on said electrode guiding members acting to increase the distance between the latter in accordance with increase in the width of said gap when said roller is riding low therein.

5. In a welding machine having a pair of spaced-apart spring metal electrode guiding members adapted to be positioned cross-wise above the gap between the adjacent edges of two metallic members to be seam-welded together, means pivotally mounted on said machine engageable with said adjacent edges of the metallic members and free to ride up and down in said gap during the welding operation in response to variations in the width thereof due to irregularities of said edges of the metallic members, said pivotally mounted means including an arm extending between said electrode guiding members, said electrode guiding members and said arm being provided with complementary interengaging wedge faces whereby the distance between said electrode guiding members is increased upon down movement of said pivotally mounted means in said gap in accordance with increase in the width of said gap, and resilient means retaining said pivotally mounted means engaged in said gap.

6. In a welding machine having a pair of spaced-apart spring acting electrode guiding members adapted to be positioned cross-wise above the gap between the adjacent edges of two metallic members to be seam-welded together, an arm pivotally mounted medially thereof on the machine at a point forwardly of said electrode guiding members, said arm including a depending end portion carrying a roller having a wedge-shaped tread riding in said gap, said roller tread being engageable with said adjacent edges of the metallic members and free to ride up and down in said gap during the welding operation in response to variations in the width thereof due to irregularities in said edges of the metallic members, said arm at its opposite end and said electrode guiding members being formed with interengaging complementary wedge faces operable to increase the distance between said electrode guiding members in accordance with increase in the width of said gap upon upward movement of the said opposite end of the arm caused by said roller riding low in said gap due to increase in the width thereof, and resilient means constantly urging said roller to gap engaging position.

7. In a welding machine having a pair of spaced-apart resilient electrode guiding members adapted to be positioned cross-wise above the gap formed by and between the adjacent edges of two metallic members to be seam-welded together, means for varying the distance between said electrode guiding members in accordance with variations in the width of said gap due to irregularities in said adjacent edges of the metallic members comprising, a pivotally mounted arm having a depending portion carrying at its end a wedge-treaded roller riding in said gap in advance of the electrodes during the welding operation, said pivotally mounted arm and said electrode guiding members having cooperatively engaging complementary wedge faces thereon, and resilient means acting to maintain said roller engaged in said gap.

8. In an automatic arc-welding machine, a pair of spaced-apart resilient electrode guide members, and means riding in the gap formed between the adjacent edges of two metallic members to be welded in advance of the electrodes, said means being operatively engaged with said electrode guide members and movable during the welding operation in response to variations in the width of said gap due to irregularities in said adjacent edges of the metallic members to correspondingly vary the distance between said electrode guide members.

References Cited in the file of this patent

UNITED STATES PATENTS

| | | |
|---|---|---|
| 2,085,808 | Krause | July 6, 1937 |
| 2,147,461 | Schroeder | Feb. 14, 1939 |